United States Patent
Pettinotto et al.

(10) Patent No.: US 11,276,957 B2
(45) Date of Patent: Mar. 15, 2022

(54) ELECTRICAL CONNECTION POINT

(71) Applicant: Schneider Electric Industries SAS, Rueil-Malmaison (FR)

(72) Inventors: Gilles Pettinotto, Vaulnaveys le Haut (FR); Michel Dalbe, Claix (FR); Yann Le-Tarnec, Grenoble (FR); Clement Virot, Saint Martin D'Heres (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 16/706,935

(22) Filed: Dec. 9, 2019

(65) Prior Publication Data
US 2020/0203884 A1 Jun. 25, 2020

(30) Foreign Application Priority Data
Dec. 19, 2018 (FR) ...................................... 1873392

(51) Int. Cl.
*H01R 13/623* (2006.01)
*H01R 13/70* (2006.01)
(Continued)

(52) U.S. Cl.
CPC ......... *H01R 13/623* (2013.01); *H01R 13/701* (2013.01); *H01R 31/06* (2013.01);
(Continued)

(58) Field of Classification Search
CPC .... H01R 13/623; H01R 13/701; H01R 31/06; H01R 31/065; H01R 33/465; H01R 33/973
(Continued)

(56) References Cited

U.S. PATENT DOCUMENTS 3,746,931 A * 7/1973 Muranaka ............ G01D 11/305
174/503
4,059,324 A * 11/1977 Snyder ................. H01R 13/623
439/321
(Continued)

FOREIGN PATENT DOCUMENTS

CN 207743434 U 8/2018
DE 40 03 701 A1 8/1991
(Continued)

OTHER PUBLICATIONS

French Prelimanary Search Report dated Oct. 14, 2019 in French Application 18 73392 filed on Dec. 19, 2018 (with English Translation of Categories of Cited Documents & Written Opinion), 8 pages.

*Primary Examiner* — Marcus E Harcum
(74) *Attorney, Agent, or Firm* — Oblon, McClelland, Maier & Neustadt, L.L.P.

(57) ABSTRACT

An electrical connection point including a functional block that includes a functional faceplate and a rear electrical plug and including a base that includes a housing to receive the functional block in a plugged in position. To reduce the risk of accidental detachment of the functional block, while improving the removable character of its fixing, the electrical connection point includes a lock with a ring that surrounds the functional faceplate and is disposed so as to be accessible from the outside of the housing when the functional block is received in the housing, the ring being rotatable relative to the rear electrical plug between an unlocking position to place the lock in the unlocking configuration and a locking position to place the lock in the locking configuration when the functional block is in the plugged in position.

12 Claims, 11 Drawing Sheets

(51) Int. Cl.
*H01R 31/06* (2006.01)
*H01R 33/46* (2006.01)
*H01R 33/97* (2006.01)
*H01R 103/00* (2006.01)

(52) U.S. Cl.
CPC ......... *H01R 31/065* (2013.01); *H01R 33/465* (2013.01); *H01R 33/973* (2013.01); *H01R 2103/00* (2013.01)

(58) Field of Classification Search
USPC .................................................. 439/312, 315
See application file for complete search history.

(56) References Cited

U.S. PATENT DOCUMENTS

| | | | | |
|---|---|---|---|---|
| 4,130,748 A * | 12/1978 | Schwer | ................ | G04C 23/02 200/38 D |
| 4,744,770 A * | 5/1988 | Drogo | .................... | H01R 13/64 439/310 |
| 5,098,316 A | 3/1992 | Koellmann et al. | | |
| 5,921,794 A * | 7/1999 | Koch | ................... | H01R 13/701 439/188 |
| 7,168,968 B1 * | 1/2007 | Li | ....................... | H01R 13/213 439/172 |
| 7,663,498 B2 * | 2/2010 | Lafaye | ................. | F21V 21/005 340/691.1 |
| 7,903,412 B2 * | 3/2011 | Spivey | ............... | H05K 7/20445 361/704 |
| 9,608,418 B1 * | 3/2017 | Elberbaum | .............. | H02G 3/16 |
| 9,742,174 B2 * | 8/2017 | Caille | ...................... | H02G 3/18 |
| 9,854,691 B2 * | 12/2017 | Caille | ................... | H05K 5/0217 |
| 9,887,489 B1 * | 2/2018 | Dietz | ................. | H01R 13/6275 |
| 10,468,840 B2 * | 11/2019 | Schaub | ................. | H01R 13/52 |
| 10,892,583 B2 * | 1/2021 | Chan | .................. | H01R 13/6675 |
| 2005/0014410 A1 * | 1/2005 | Justice | ................. | H01R 13/623 439/320 |
| 2005/0208820 A1 * | 9/2005 | Sanuki | ................. | H01R 13/623 439/372 |
| 2008/0171456 A1 * | 7/2008 | Vanzo | ................. | H01R 13/625 439/164 |
| 2009/0142952 A1 * | 6/2009 | Akasaka | ................. | H01R 13/622 439/314 |
| 2015/0050827 A1 * | 2/2015 | Chang | ................ | H01R 13/6275 439/312 |
| 2016/0198581 A1 | 7/2016 | Caille | | |
| 2017/0256899 A1 * | 9/2017 | Mitchell | ................ | H01R 13/53 |
| 2017/0338605 A1 | 11/2017 | Payet-Burin | | |
| 2019/0003692 A1 * | 1/2019 | Frederiksen | ........... | H01R 43/26 |
| 2020/0076143 A1 * | 3/2020 | Reese | ................. | H01R 25/006 |

FOREIGN PATENT DOCUMENTS

FR 3 000 310 A1 6/2014
KR 10-2017-0060646 A 6/2017
WO WO 2016/071599 A1 5/2016

\* cited by examiner

[Fig. 1]
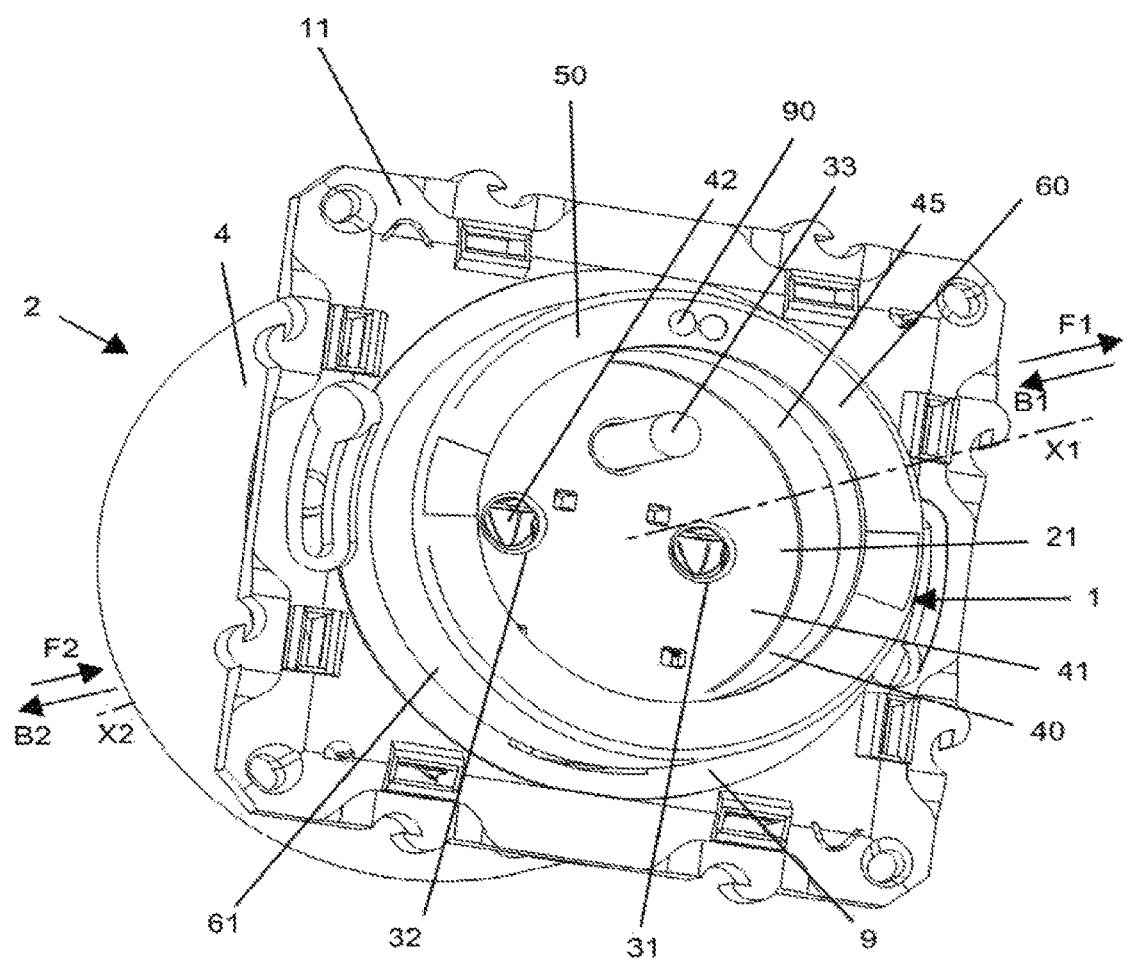

[Fig. 2]
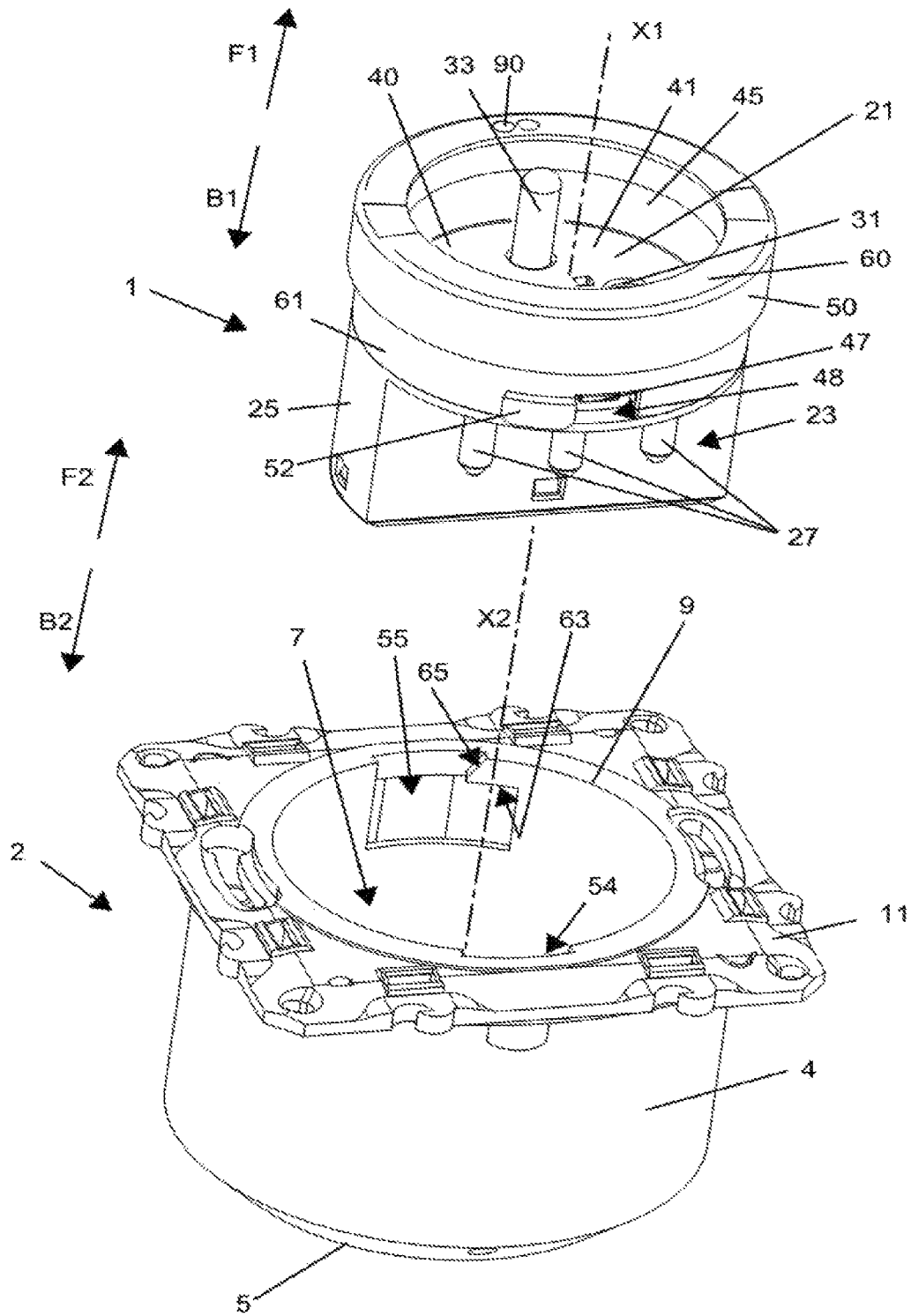

[Fig. 3]
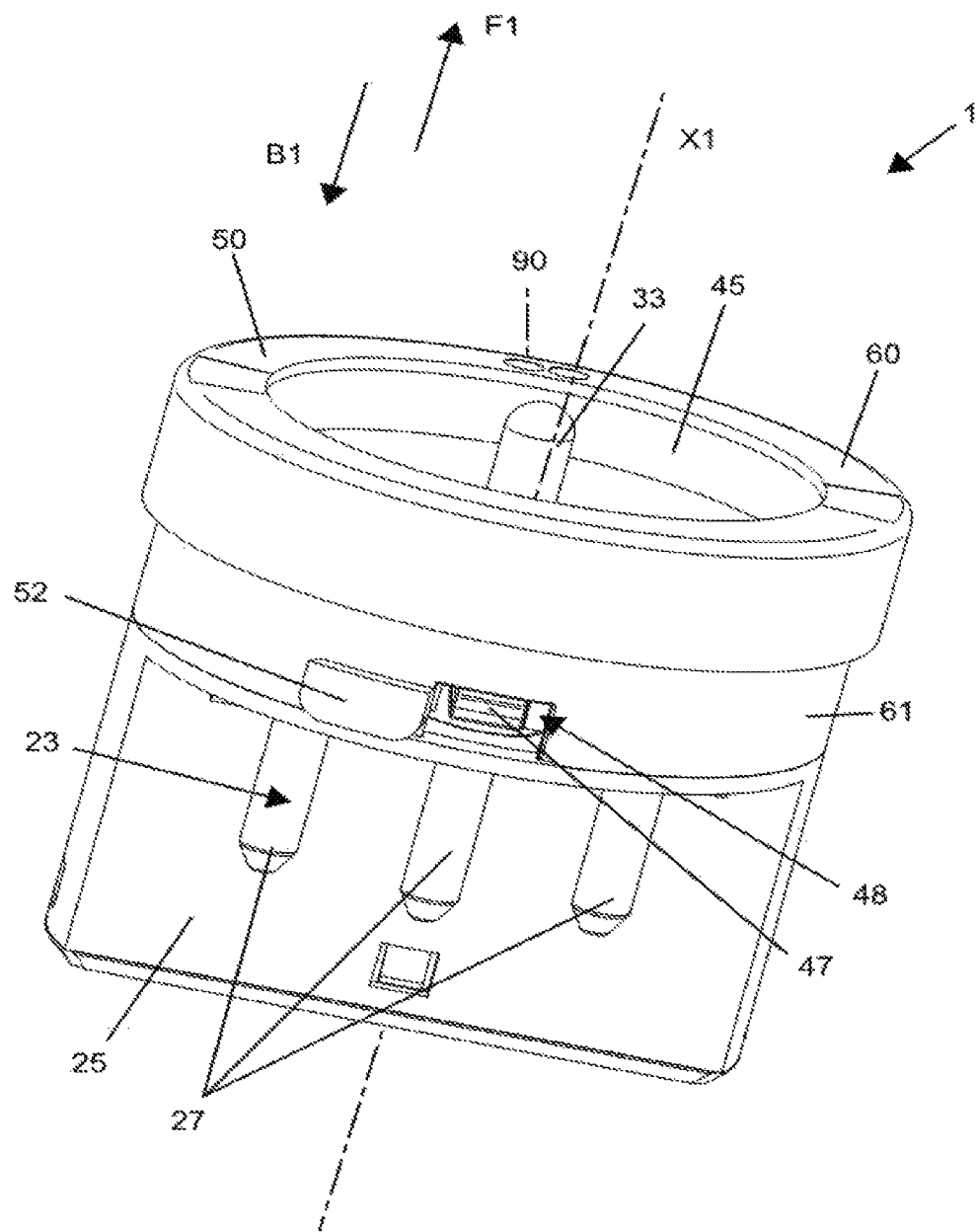

[Fig. 4]
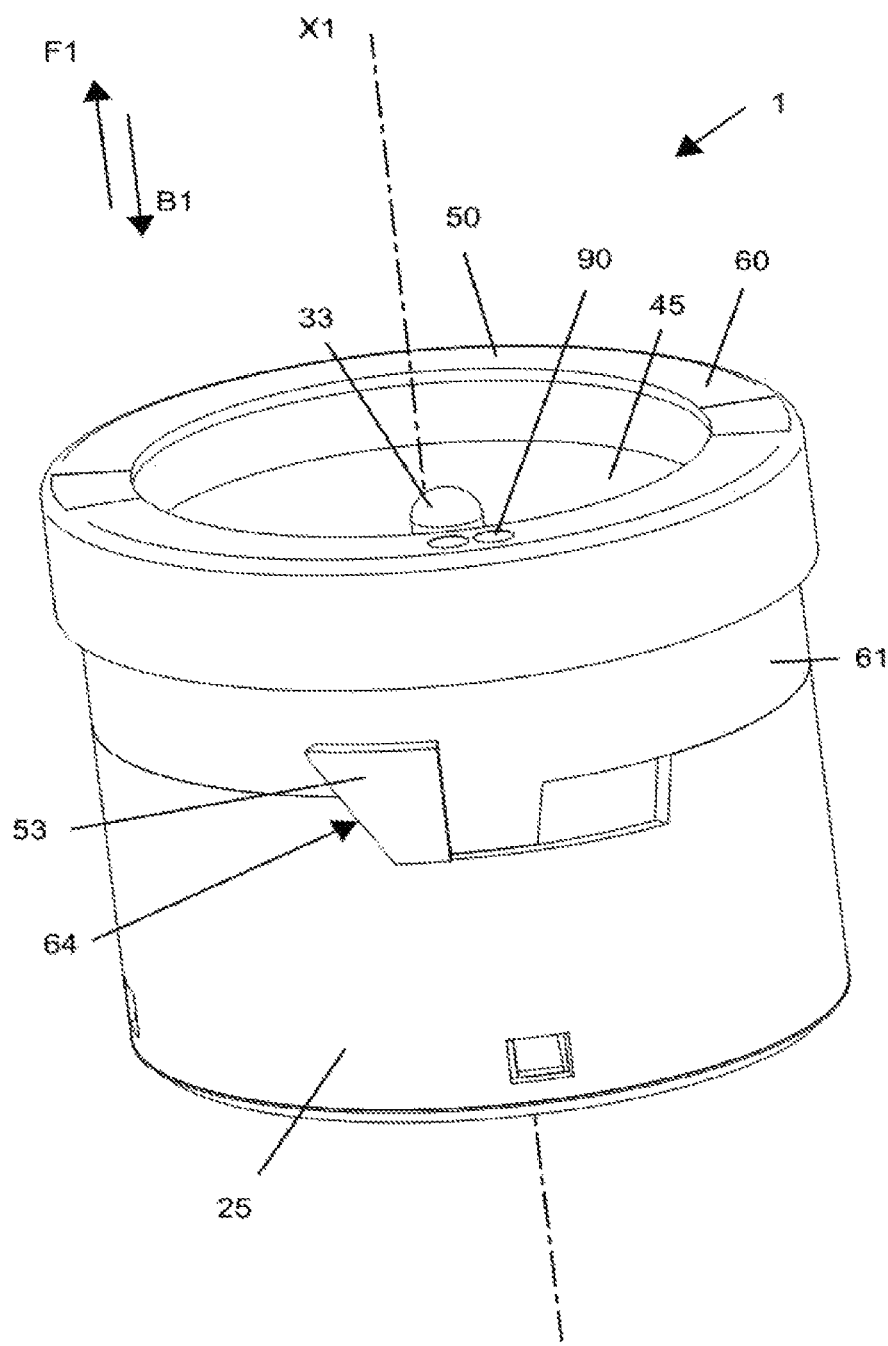

[Fig. 5]
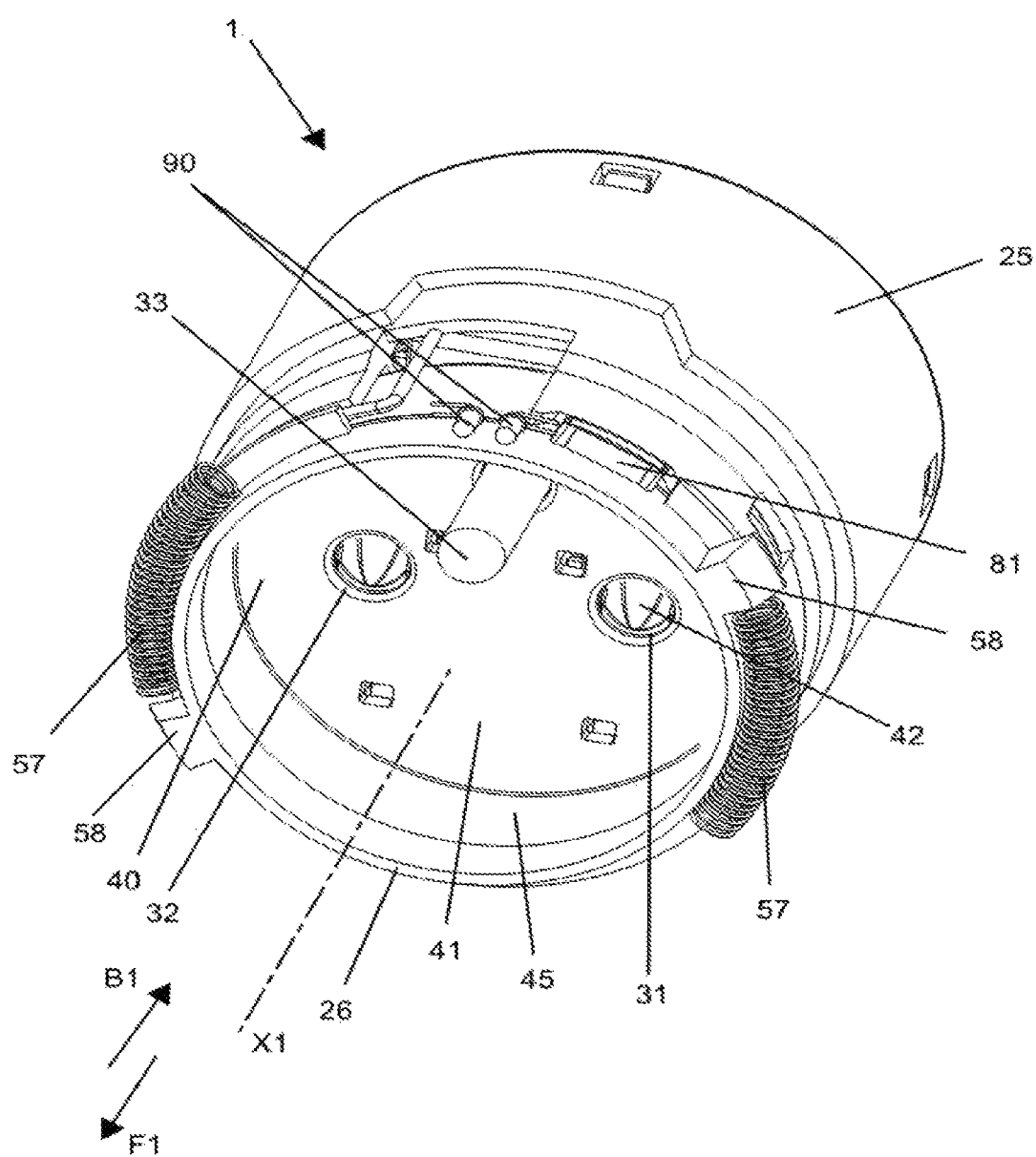

[Fig. 6]
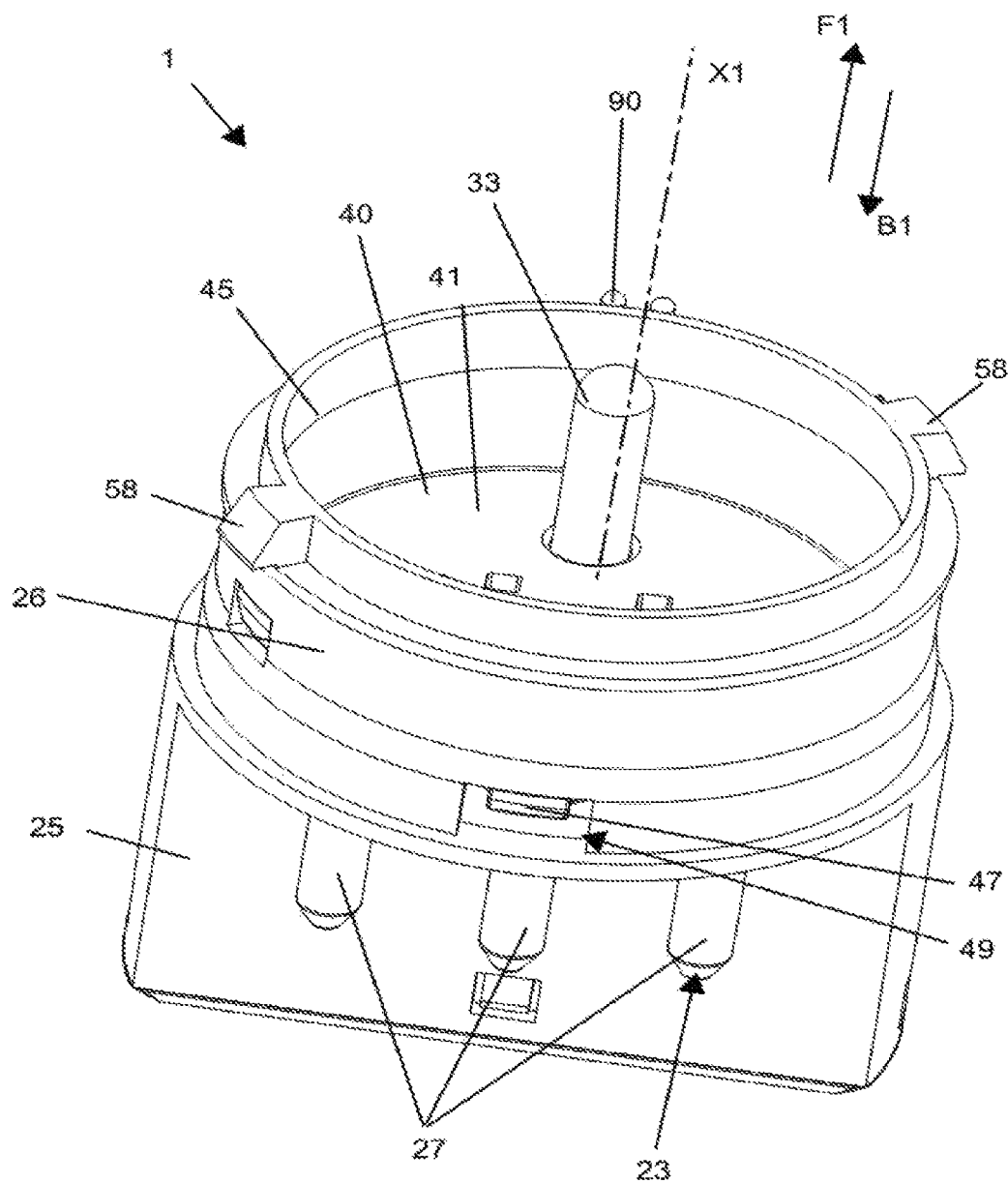

[Fig. 7]
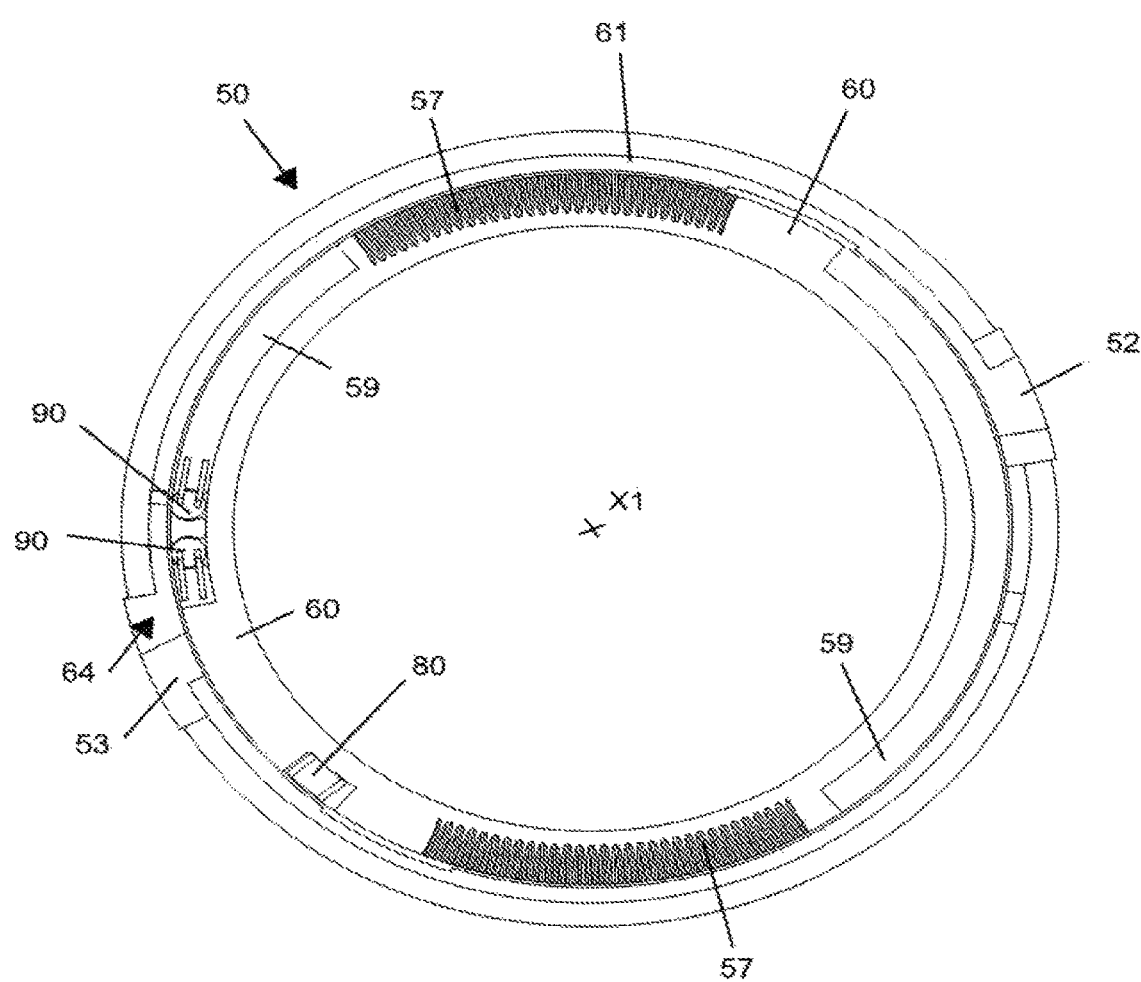

[Fig. 8]
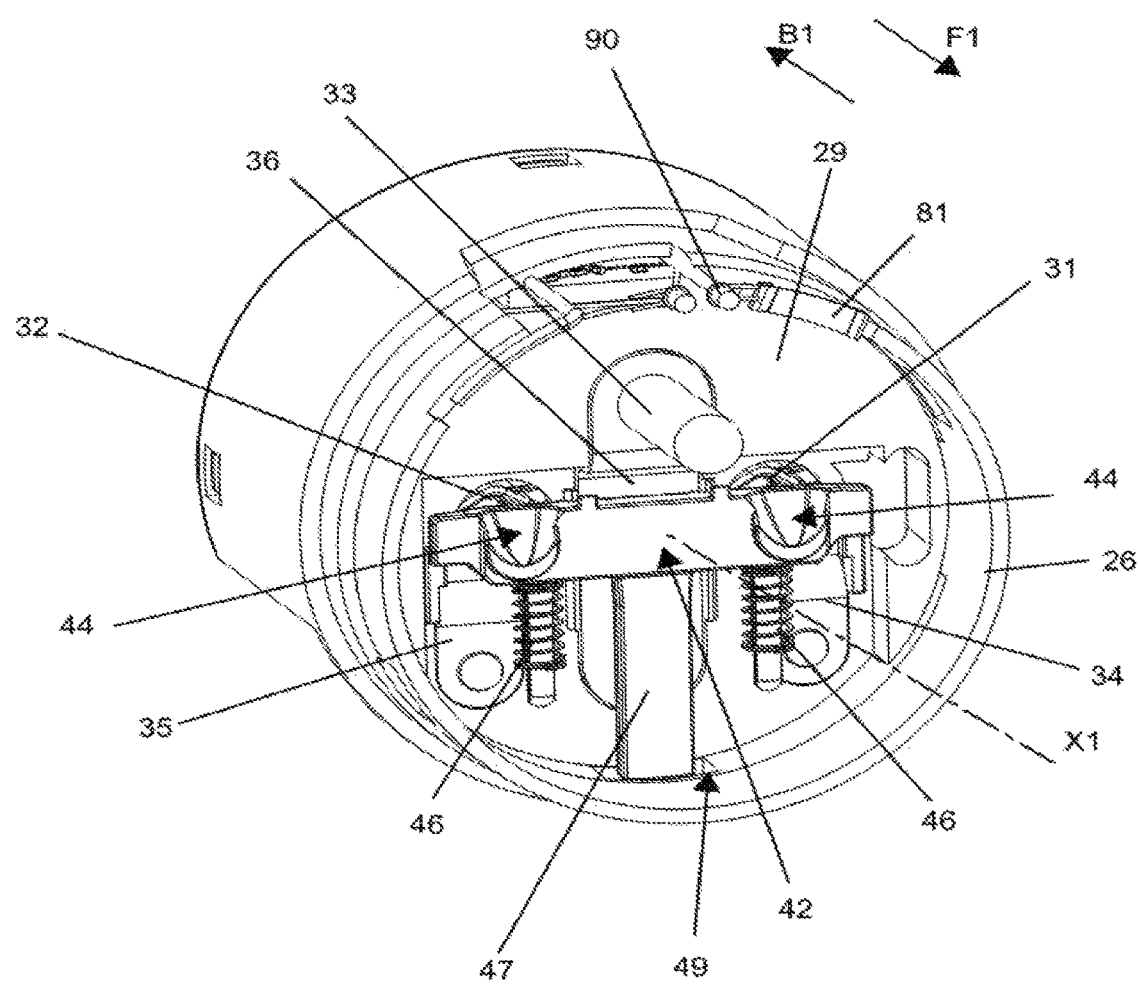

[Fig. 9]
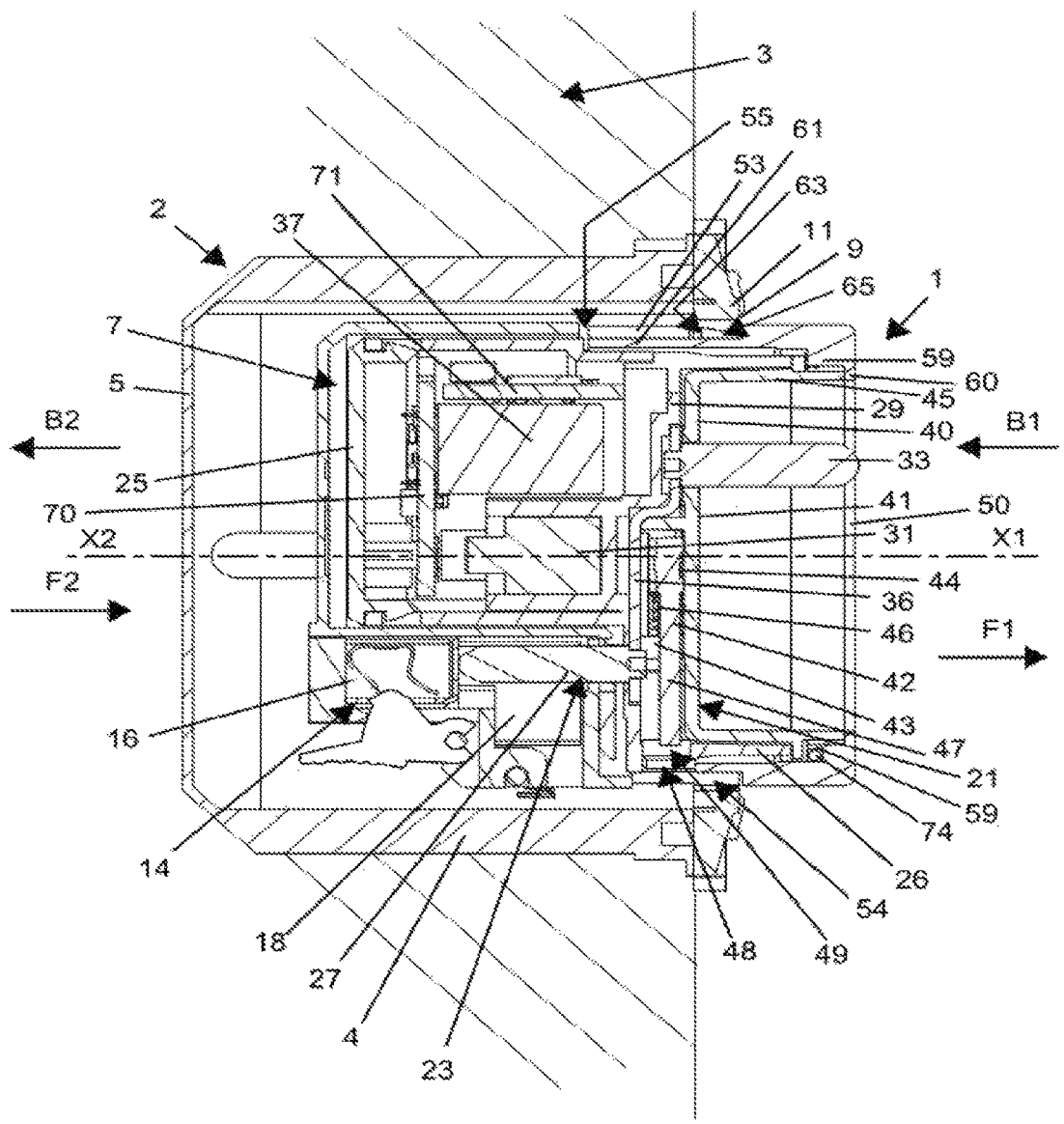

[Fig. 10]
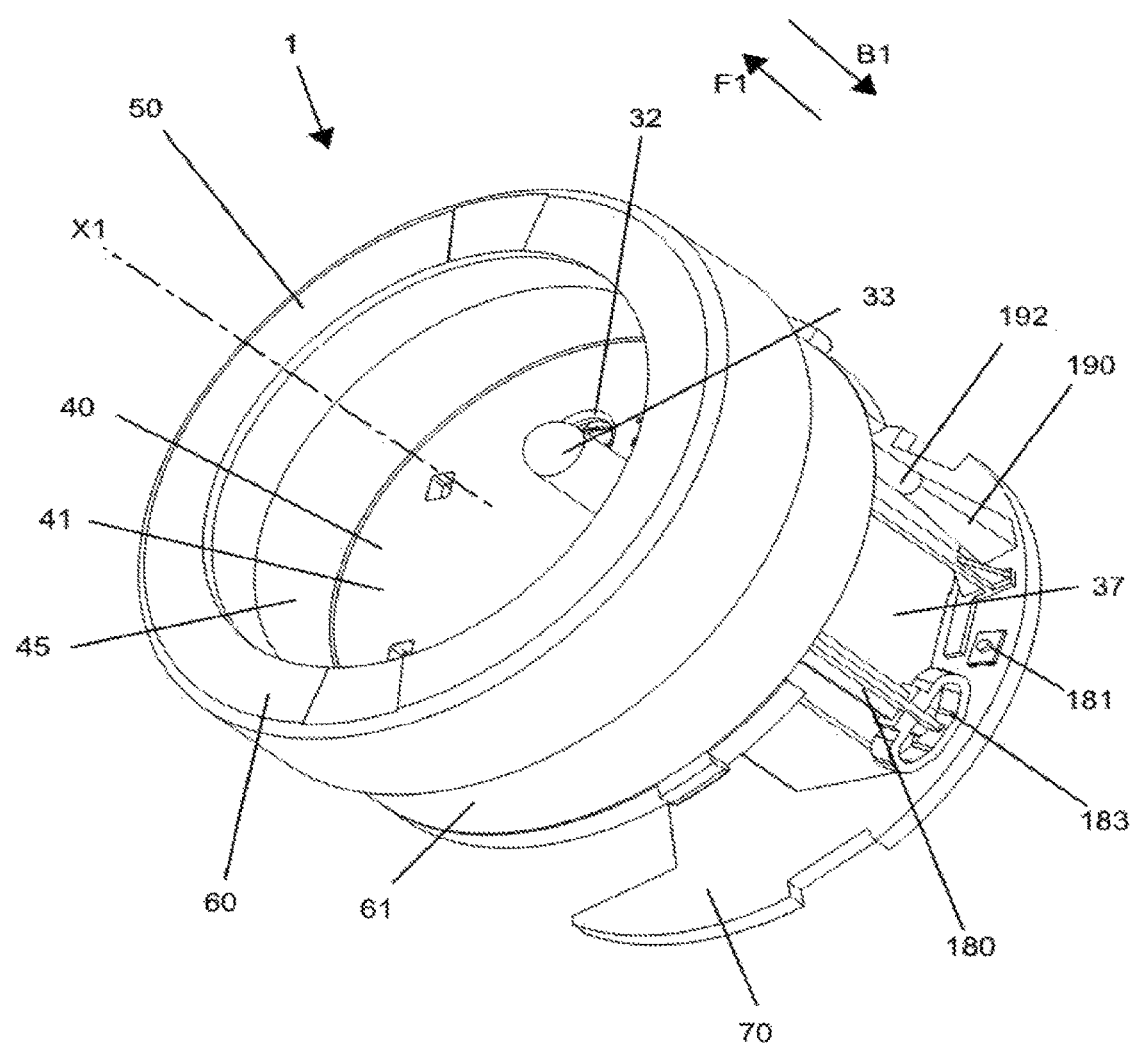

[Fig. 11]
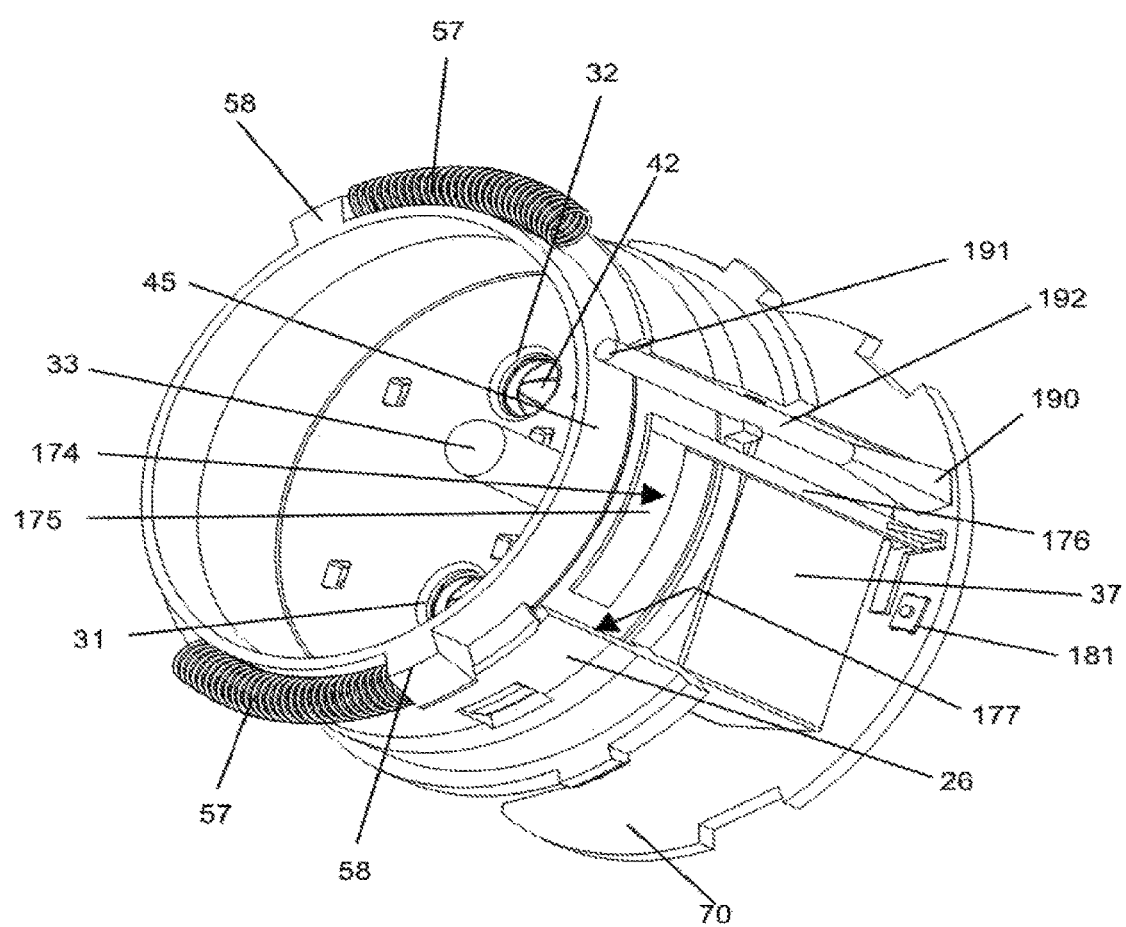

ELECTRICAL CONNECTION POINT

The present invention concerns an electrical connection point.

WO2016071599A1 describes a wall-mounted electrical connection point comprising a wall-mounted block. The wall-mounted block is designed to be mounted permanently in the wall and connected to the electrical mains supply. The wall-mounted connection point comprises a plurality of functional blocks, the wall-mounted block being designed to receive one of them in turn. The functional block received by the wall-mounted block is then removably fixed to the wall-mounted block so that it can be replaced by another functional block as a function of use. Each functional block provides a particular electrical function that is put into service when the functional block is fixed to the wall-mounted block. To make the electrical connection between the wall-mounted block and the functional block the wall-mounted block is provided with connecting clips while each functional block is provided with pins complementary to these clips.

This known wall-mounted connection point has the main disadvantage that the functional block can be accidentally detached from the wall-mounted block because of the removable nature of the fixing of the functional block to the wall-mounted block. For example, if the functional block provides an electrical power socket outlet for an electrical device and receives a plug belonging to said electrical device, traction on the plug of the electrical device risks accidental separation of the functional block and the wall-mounted block. The sudden disconnection of the electrical power supply that results from this accidental detachment may generate an electrical arc and/or damage the electrical device that was being powered by the connection point.

One objective of the invention is to resolve the disadvantages of the prior art mentioned above by proposing a new electrical connection point reducing the risk of accidental detachment of the functional block while improving the removable character of the fixing of the functional block.

The invention consists in an electrical connection point comprising:

- at least one functional block, which comprises a functional faceplate and a rear electrical plug fastened to the functional faceplate; and
- a base for permanently fixing the electrical connection point to a support, the base comprising a housing and an internal electrical connector opening into the housing, the functional block being receivable in the housing up to a plugged in position in which the rear electrical plug is plugged into the internal electrical connector.

According to the invention the electrical connection point further comprises a lock that evolves between an unlocking configuration in which the lock allows removal of the functional block from the housing when the functional block is received in the housing and a locking configuration in which the lock retains the functional block in the plugged in position. Moreover, the lock comprises a ring that is part of the functional block, surrounds the functional faceplate and is disposed so as to be accessible from outside the housing when the functional block is received in the housing, the ring being rotatable relative to the rear electrical plug between an unlocking position to place the lock in the unlocking configuration and a locking position for placing the lock in the locking configuration when the functional block is in the plugged in position.

Thanks to the invention, it is easy to remove and to detach the functional block from the base in that for this purpose it suffices, preferably without tools, to turn the ring to the unlocking position, which pivots the lock to the unlocking configuration, so that the functional unit is free to be removed from the housing. However, if the lock is in the locking configuration merely pulling on the functional block does not remove it from the housing because the lock retains the functional block in the plugged in position. However, when necessary it is easy to remove the functional block from the base, for example to replace it with another functional block, because the lock can be unlocked by simply rotating the ring, which is accessible from the outside, preferably with no tools. In particular, it is not necessary to demount the connection point to effect this unlocking and because of its ring shape and its disposition around the functional faceplate the ring is relatively discrete or even aesthetically pleasing.

Other optional features of the invention are defined hereinafter:

- The ring is rotatable relative to the rear electrical plug about a rotation axis on which the functional faceplate is centred and with which the ring is coaxial; the lock comprises at least one locking notch that is part of the base and opens into the housing, being oriented when the functional block is received in the housing radially inwards relative to the rotation axis; the ring comprises for each locking notch a respective lock that projects radially outwards relative to the rotation axis; and when the functional block is in the plugged in position and the lock is in the locking configuration each lug cooperates mechanically with its corresponding locking notch to retain the functional block in the plugged in position.
- At least one of the locking notches and its corresponding lug comprise a helicoidal sloping surface and are configured so that: on introduction of the functional block into the housing toward the plugged in position the locking notch and the lug come into contact via the helicoidal sloping surface to mechanically drive rotation of the ring to the unlocking position; and when the functional block is in the plugged in position the locking notch and the lug are no longer in contact via the helicoidal sloping surface, which allows placing of the ring in the locking position.
- The lock further comprises at least one lock spring that exerts an elastic force urging the ring into the locking position when the ring is in the unlocking position, each lock spring being disposed between the ring and the functional faceplate.
- The functional block comprises an electronic system that comprises an electronic circuit card disposed inside the functional block, the ring being rotatable to a control position in which the ring commands a change of state of the electronic system, the control position being distinct from the locking position.
- The electronic system comprises a primary contact carried by the ring and a secondary contact carried by the functional faceplate, the primary contact and the secondary contact being positioned so as to be placed in electrical contact with one another when the ring reaches the control position so as to command the change of state of the electronic system.
- The electronic circuit card comprises a control button positioned on the surface of the electronic circuit card, the ring comprising a control leg that in the controlled position of the ring presses on the control button to command the change of state of the electronic system.

The electronic system comprises an antenna that is electrically connected to the electronic circuit card, which extends at least in part between the ring and the functional faceplate.

The electronic system comprises a luminous termination that is disposed between the ring and the functional faceplate so as to be visible through the ring when the luminous termination is lit.

The functional faceplate forms an external electrical socket opening to the outside of the housing when the functional block is received in the housing, the external electrical socket being designed so that an external electrical plug of an electrical device is plugged into the external electrical socket in order to supply said electrical device via this external electrical plug with electrical energy received by the rear electrical plug.

The functional block further comprises a shutter that is mobile between: a primary position in which the shutter immobilizes the lock in the locking configuration, the shutter being placed in the primary position by the external electrical plug when the external electrical plug is plugged into the external electrical socket; and a secondary position in which the shutter allows the lock to change between the locking configuration and the unlocking configuration, the functional block comprising at least one safety spring that exerts an elastic force urging the shutter into the secondary position when the shutter is in the primary position.

Other features of the invention emerge in more detail from the following nonlimiting description of preferred embodiments of the invention, that description referring the appended drawings listed below:

FIG. 1 is a perspective view of an electrical connection point in accordance with a first embodiment of the invention;

FIG. 2 is an exploded perspective view of the electrical connection point from FIG. 1;

FIGS. 3 and 4 are two perspective views from different angles of the functional block belonging to the connection point from the previous figures;

FIGS. 5 and 6 are two perspective views from different angles of the functional block from the previous figures omitting a ring that is part of the functional block;

FIG. 7 is a view from behind of the ring, lock springs and luminous terminations of the functional block from the previous figures;

FIG. 8 is a perspective view of the functional block from the previous figures omitting the ring, the lock springs and an embellisher of the functional block;

FIG. 9 is a longitudinal section of FIG. 1 and also represents a support;

FIG. 10 is a perspective view of a functional block of an electrical connection point in accordance with a second embodiment of the invention, omitting a rear part of the rear module;

FIG. 11 is a view similar to FIG. 10 also omitting a ring.

FIGS. 1 to 9 show an electrical connection point in accordance with a first embodiment of the invention comprising a functional block 1 and a base 2. The electrical connection point may comprise one or more other functional blocks that can be alternately associated with the same base 2 and preferably provide a specific electrical function different from that of the block 1.

The electrical connection point is designed to be installed in a building or outdoors, being built into or fixed permanently to a support, such as a wall or a floor. The electrical connection point is particularly suitable for installing in a dwelling. The electrical connection point is designed to be electrically connected to an electrical mains supply equipping the support, in particular equipping the building, for example a single-phase electrical mains supply delivering a voltage of 240 V. More generally, the electrical mains supply could be single-phase or multiphase, for example three-phase, in a voltage range between 80 V and 600 V.

The base 2 of the electrical connection point is designed to be permanently fixed to the support of the connection point, that support being for example a wall 3 of the building, as shown in FIG. 9. The base may therefore be termed a flush-mount support. On the contrary, the functional block 1 is removably fixed to the base 2, that is to say specifically designed to be fixed to and easily detached from the base 2.

The base 2 is in the general form of a container, as can be seen in FIGS. 1, 2 and 9 in particular. The base 2 comprises a niche that comprises a peripheral wall 4, here cylindrical with a circular base, coaxial with an axis X2 of the base 2, the axis X2 being fixed relative to the base 2. The niche of the base 2 also includes a back 5 orthogonal or transverse to the axis X2, closing the peripheral wall 4, and therefore the niche, at its rear axial end. At its front axial end, opposite the back 5, the wall 4 is open. Thus the base 2 comprises a housing 7 that is preferably aligned in the direction of the back 5. Here the housing 7 is delimited by the niche of the base 2, in particular by the back 5, in a rear axial direction B2 of the socket 2, parallel to the axis X2, by the wall 4 in radial directions relative to the axis X2. The housing 7 is open in a forward axial direction F2 of the base 2 opposite the direction B2. The end of the wall 4 in the axial direction F2 forms a peripheral edge of the opening edge 9 delimiting the opening of the housing 7. The axis X2 may be seen as coaxial with the cylindrical shape of the housing 7.

In the present document, where the base 2 is concerned, terms such as "axial", "radial" and "height" refer to the axis X2 unless explicitly stated to the contrary.

The base 2 preferably comprises a fixing plate 11 that extends radially outwards from the opening edge 9 essentially in a plane orthogonal to the axis X2. The fixing plate 11 may optionally receive an annular masking part, not shown, to protect the fixing plate 11 and to conceal it from the eyes of the user.

To be permanently fixed to the support 3 the base 2 is advantageously built into the support 3, the niche being entirely received in a blind opening formed in said support, the fixing plate 11 preferably extending out of the blind opening and at least partly covering the edge of that blind opening. The base 2 advantageously has orifices passing through it, for example passing through the fixing plate 11 and/or the back 5, for fixing the base 2 permanently to the support using screws or similar fixing means. Moreover, the base 2 may advantageously comprise retaining means of the claw or spike type to obtain permanent fixing built into the support 3. When the support 3 is a wall as in FIG. 9 the axis X2 is horizontal. When the support 3 is a floor or a ceiling the axis X2 is vertical.

The base 2 further comprises an internal electrical connector 14 that can be seen in the FIG. 9 section.

Here the connector 14 is entirely contained in the housing 7, in the vicinity of the back 5, and is fastened to the niche. Alternatively, the connector 14 may be partly contained in the housing 7, simply so as to open into the housing 7.

The connector 14 comprises at least one pole, each pole preferably comprising an electrical terminal 16 projecting in the direction B2 for example and a female electrical connector 18, such as a connection clip or a receptacle, open for example in the direction F2. The female connector 18 of each pole of the connector 14 opens into the housing 7. The terminal 16 and the female connector 18 of each pole of the connector 14 are electrically connected. The connector 14 preferable comprises at least as many poles as the number of poles of the electrical mains supply to which the base 2 is intended to be electrically connected. In particular the connector 14 comprises one more pole than the number of poles of the electrical mains supply to which the base 2 is intended to be electrically connected, that additional pole being an earth pole that does not belong to the electrical mains supply. In the present example the electrical connection point is designed to be connected to a single phase and earth mains supply. The mains supply has two poles formed by a respective two conductors, namely a live pole and a neutral pole. The earth constitutes a third pole, forming a third conductor. The connector 14 therefore also comprises three poles, namely a live pole, a neutral pole and an earth pole. In FIG. 9 only the earth pole is shown, including its terminal 16 and its female connector 18. The terminal 16 is designed to receive one of the conductors of the electrical mains supply in order electrically to connect the pole concerned of the connector 14 to that conductor. When the base 2 is permanently mounted on the support 3 and the poles of the internal connector 14 are electrically connected to the respective poles of the electrical mains supply each pole of the connector 14 delivers to its corresponding connector 18 electrical energy coming from the electrical mains supply.

As can be seen in FIGS. 2 to 6 and 9 in particular the functional block 1 comprises a functional faceplate 21, a rear electrical plug 23 and a rear module 25 that are fastened to one another.

If the connection point is designed to comprise a plurality of functional blocks, the rear plug 23 is preferably identical or at least functionally equivalent from one functional block to another. From one functional block to another the functional faceplate 21 differs, for example, together with the content of the module 25 if any such module 25 is provided.

The functional block 1 defines an axis X1 that passes through the faceplate 21 and preferably the module 25. A forward axial direction F1 of the functional block 1 is defined, parallel to the axis X1, and a backward axial direction B1 of a functional block 1 is defined, opposite to the direction F1.

In the present document, where the block 1 is concerned, terms such as "axial", "radial" and "height" refer to the axis X2 unless explicitly stated to the contrary.

The faceplate 21 faces in the direction F1 while the plug 23 faces in the direction B1. Relative to the plug 23 and the module 25 the faceplate 21 is disposed in the direction F1.

The functional block 1 is designed to be received by the base 2 in the housing 7 so as to be removably fixed thereto. To this end the plug 23 is inserted, with the module 25 if present, into the housing 7, via the edge 9, the block 1 moving in the direction F1 relative to the base 2. The functional block 1 is removed from the housing 7 by movement of the block 1 in the direction B1 relative to the base 2. Once removed, the block 1 is entirely outside the housing 7.

The rear electrical plug 23 is designed to be plugged into the internal electrical connector 14, as is the case in FIGS. 1 and 9. When the plug 23 is plugged in, the block 1 is received in the housing 7, positioned relative to the base 2 in a so-called "plugged in" position. In particular, in the plugged in position, the plug 23 is radially surrounded by the wall 4 and, if present, the module 25.

When the plug 23 is plugged in the plug 23 is electrically connected to the connector 14. The block 1 is then supplied with electrical energy by the connector 14, via the plug 23. When the plug 23 is not plugged in, which is in particular the case when the block 1 is outside the housing 7, the block 1 is not supplied with energy by the connector 14.

The plug 23 preferably comprises as many poles as the connector 14, each pole of the plug 23 being electrically connected to one of the poles of the connector 14 when the plug 23 is plugged in. Each pole of the plug 23 advantageously comprises a male electrical connector 27 which for example takes the form of an electrical pin and is complementary to one of the female electrical connectors 18. Each connector 27 advantageously faces in the direction B1 so as to face the corresponding connector 18 when the block 1 is received in the housing 7. As shown in FIG. 9, in the plugged in position, for each pole, a connector 27 is received in the connector 18. In the plugged in position the poles of the plug 23 and of the connector 14 are therefore respectively electrically connected.

In the plugged in position, the module 25, if present, is entirely received in the housing 7 and the face of the faceplate 21 facing in the direction F1 is accessible from outside the housing 7. This access to the faceplate is obtained either via the edge 9, in that the faceplate 21 is radially surrounded by the edge 9, or because the faceplate 21 projects out of the housing 7 in the direction F1. In the plugged in position the axes X1 and X2 are preferably coaxial and the directions F1 and F2 are the same direction.

When the plug 23 is plugged into the connector 14 the block 1 may preferably slide parallel to the axis X2 relative to the base 2, the plug 23 then sliding in the connector 14. The axis X2 may therefore be termed a sliding axis. In the plugged in position the block 1 is advantageously unable to rotate about the axis X2 relative to the base 2.

The plug 23 slides in the connector 14 by virtue of the connectors 27 sliding in their respective connector 18. To this end each connector 27 is parallel to the axis X1 and each connector 18 is parallel to the axis X2.

To guide sliding of the block 1 in the base 2 the casing 25 of the block 1 and the housing 7 advantageously have a complementary shape that guides sliding of the block 1 relative to the base 2 along the axis X2. This complementary shape advantageously prevents rotation about the axis X2 so that once inserted into the housing 7 the block 1 adopts a predetermined orientation relative to the base 2 about the axis X2.

The plugged in position is preferably reached when the block 1, sliding relative to the base 2, reaches axial abutment relative to the base 2, in the direction B1. This abutment is preferably obtained by the plug 23 coming into abutment on insertion in the connector 14. For example, the plugged in position is reached when at least one of the connectors 27 abuts against the back of its connector 18 in the direction B1.

In a variant, the plugged in position could be reached when the plug 23 is plugged into the connector 14 while the module 25 abuts against the back 5 in the direction B1.

Alternatively or additionally the immobilization against rotation of the block 1 relative to the base 2 about the axis X2 is obtained by mechanical anti-rotation cooperation of the plug 23 with the connector 14. For example, to this end the connectors 18 and 27 are, as in the present example, radially offset relative to the axes X1 and X2.

For the functional block 1 shown in FIGS. 1 to 9 the functional faceplate 21 forms an external electrical socket facing in the direction F1. This external electrical socket is supplied with electrical energy by the rear electrical plug 23. The external electrical socket is designed so that a complementary external electrical plug, not shown, belonging to an electrical device, that is to say a device to be supplied with electrical energy via the external plug, is plugged into the external electrical socket of the faceplate 21. This electrically connects the external socket with the external plug. This electrical device is therefore supplied by the external electrical socket via its external electrical plug with electrical energy received by the rear electrical plug 23. In the plugged in position of the block 1, when the base 2 is connected to the electrical mains supply of the support 3, the external plug receives electrical energy supplied by the mains supply via the connector 14, the rear plug 23 and the external socket of the faceplate 21 into which the external plug is plugged.

When the block 1 is received in the housing 7, the external electrical socket is open to the outside on the support 3 and from the housing 7 in the direction F1 to be able to receive an external plug.

The faceplate 21, forming an external electrical socket, comprises as many poles as the plug 23, each pole preferably comprising either an electrical receptacle, for example when the pole is a live or neutral pole, or an electrical pin, for example when the pole is the earth pole. One of the poles, in particular the earth pole, may also comprise a terminal in the form of a blade disposed at the periphery of the faceplate 21. Here the faceplate 21 comprises two poles 31 and 32, respectively live and neutral receptacles, and an electrical earth pole 33, here a pin. Each pole 31, 32 and 33 is electrically connected to one of the corresponding poles, here one of the connectors 27, of the rear plug 23. For example, as can be seen in FIGS. 8 and 9, the pole 33 is electrically connected to one of the poles of the plug 23, here one of the connectors 27, via a fixed contact 36, making a permanent electrical connection.

The block 1 preferably comprises means for electrically disconnecting on command at least one of the poles of the faceplate 21 from its corresponding pole of the plug 23. For the block 1 shown such means advantageously comprise a relay 37 visible in FIG. 8 carrying mobile contacts not visible in the figures and, respectively for each pole 31 and 32, one of the respective fixed contacts 34 and 35. The mobile contacts of the relay 37 are actuated between a position opening and a position closing the fixed contacts 34 and 35 of the relay 37. In the open position of the relay 37 at least one of the poles 31 and 32 is no longer supplied with electrical energy by the plug 23 while in the closed position electrical energy is supplied.

Alternatively, the poles 31 and 32 may be electrically connected to their respective connector 27 or pole of the plug 23 in the same way as the pole 33, that is to say by respective individual fixed contacts providing a permanent supply of electrical energy to the poles 31 and 32 respectively via the corresponding poles in the plug 23.

To protect the user from the electrical voltage present inside the block 1 the faceplate 21 advantageously comprises an embellisher 40 disposed in the direction F1 relative to the fixed contacts 34, 35 and 36. The embellisher 40 advantageously comprises an electrically insulative material plate 41 that lies in a plane orthogonal to the axis X1. As shown, the plate 41 is for example of discoid shape centred on the axis X1. The embellisher 40 preferably further comprises a circular section tubular rim 45 upstanding from the plate 41 in the direction F1 and coaxial with the axis X1. The embellisher 40, in particular the plate 41, has orifices passing through it providing access to the respective electrical receptacles of the external socket, here the receptacles of the poles 31 and 32, and has passed through it any electrical pin of the external socket, here the pin of the pole 33.

In the present example the faceplate 21, in particular the embellisher 40, is mounted against the module 25, at a front axial end of the module 25 in the direction F1. In particular, the faceplate 21 is mounted against a wall 29 of the module 25, in the direction F1 relative to said wall 29. The wall 29 is preferably orthogonal to the axis X1. The module 25 therefore delimits an internal compartment in the block 1 that is separated from the plug 23 and the faceplate 21. The embellisher 40 is preferably mounted coaxially inside an annular wall 26 of the module 25, the annular wall 26 being formed at the front axial end of the module 25 in the direction F1. The annular wall 26 then radially surrounds the embellisher 40. The wall 29 advantageously closes the annular wall 26 at a rear axial end in the direction B1 of said annular wall 26.

The contacts 34, 35 and 36 are advantageously disposed between the plate 41 of the embellisher 40 and the wall 29.

When the faceplate 21 has an external socket function, the faceplate 21 preferably further comprises a sliding shutter 42 that moves by sliding relative to the receptacles 31 and 32 along an axis radial relative to the axis X1 between a primary position in which the shutter 42 does not obstruct the receptacles 31 and 32 and a secondary position in which the shutter 42 obstructs the receptacles 31 and 32. In the primary position the shutter 42 is offset radially outwards relative to the secondary position. The shutter 42 is in the secondary position in the figures. The shutter 42 is advantageously made of electrically insulative material. As can be seen in FIG. 9 the shutter 42 is preferably disposed between the embellisher 40 and the contacts 34 and 35 or between the embellisher 40 and the wall 29 of the module 25. In the secondary position the shutter 42 prevents a user from coming into electrical contact with the electrically conductive parts inside the receptacles 31 and 32.

The faceplate 21 comprises two safety screens 46 which exert an elastic force urging the shutter 42 into the secondary position when the shutter 42 is in the primary position. Alternatively a number of springs 46 other than two may be provided, or a single spring 46.

The shutter 42 is preferably carried and guided when its slides by guides 43 of the faceplate 21, one of which can be seen in FIG. 9. These guides 43 advantageously project from the surface of the plate 41 of the embellisher 40 in the direction B1, each spring 46 being disposed between one of the guides 43 and the shutter 42.

The shutter 42 advantageously comprises for each receptacle 31 and 32 a respective sloping surface 44 facing in the direction F1 which in the secondary position extends into the opening of the receptacle 31 or 32 concerned to block it. When the external electrical plug is plugged into the external socket formed by the faceplate 21 electrical pins of the external plug are inserted into the receptacles 31 and 32 and each presses one of the surfaces 44 in the direction B1 to move the shutter 42 to the primary position, thanks to the shape of the slope of the surfaces 44. When the external electrical plug is plugged into the external electrical socket on the block 1 the shutter 42 is therefore moved to and retained in the primary position by the electrical pins of the external electrical plug, against the action of the springs 46.

The block 1 comprises a ring 50 of tubular general shape coaxial with the axis X1. The ring is preferably made of an electrically insulative material. In the present example the ring 50 surrounds the faceplate 21 and projects from the faceplate in the direction F1. In particular, the ring 50 radially envelops from the outside the rim 45 on the embellisher 40 and extends beyond that rim 45 in the direction F1. Alternatively, the ring 50 is disposed in the direction F1 relative to the faceplate 21. In the plugged in position of the block 1 part of the ring projects in the direction F1 relative to the peripheral rim 9 of the housing and, if present, relative to the fixing plate 11 and any masking part that might be mounted on this fixing plate 11 in the direction F1. The ring 50 therefore projects beyond the support 3 in the direction F1.

The ring 50 is rotatable about the axis X1 relative to the faceplate 21, the plug 23 and the module 25, or at least relative to the plug 23. The axis X1 may therefore be termed a rotation axis.

To be more precise, the ring 50 advantageously comprises at its rear axial end in the direction B1 a skirt 61 and at its front axial end in the direction F1 a front ring 60.

The skirt 61 advantageously has a tubular shape of circular section centred on the axis X1 and is disposed around the faceplate 21, in particular around the embellisher 40. The skirt 61 in particular guides rotation of the ring 50. Here the skirt 61 is supported and guided in rotation by the faceplate 21, in particular by the rim 45 of the embellisher 40 and/or by the annular wall 26 of the module 25. The ring 50 is preferably rotatable relative to the plug 23 about the axis X1 but fixed in a direction parallel to the axis X1 relative to the plug 23.

The ring 60 is preferably centred on the axis X1 and extends radially inwards from a front edge of the skirt 61. The ring 60 lies in a plane orthogonal to the axis X1. Radially at the centre of the ring 60 an opening is formed to enable the functional faceplate 21 to be reached axially through the ring 50. In the plugged in position of the block 1 at least the ring 60 projects from the housing 7 and from the support 3 in the direction F1 so that the user is able to rotate the ring 50.

More generally the at least the part of the ring 50 that projects in the direction F1 from the outside of the housing 7 when the block 1 is in the plugged in position is disposed so as to be accessible. In this plugged in position of the block 1 a user can therefore actuate the ring 50.

The ring 50 is limited in its rotation relative to the plug 23 about the axis X1 between two positions, namely a locking position shown in the figures and an unlocking position distinct from the locking position. For example, between the locking position and the unlocking position the ring 50 rotates less than 45° (degrees) or even less than 30° relative to the plug 23 about the axis X1.

The block 1 advantageously comprises two springs 57 visible in FIGS. 5 and 7, termed "lock springs". Each spring 57 exerts an elastic force on the ring 50 that tends to rotate the ring 50 into the locking position, in particular when the ring is in the unlocking position. Thus in the absence of external loading the ring 50 is returned automatically to the locking position by the action of the springs 57.

In the present example each spring 57 is a compression coil spring. The axis of each spring 57 is preferably curved and extends over a circular arc about the axis X1, as shown in FIGS. 5 and 7. Each spring 57 is then an orthoradial compression spring and advantageously lies in a plane orthogonal to the axis X1. Each spring 57 can therefore be disposed circumferentially between a respective orthoradial abutment 58 of the faceplate 21 or of the annular wall 26 of the module 25 and a respective orthoradial abutment 59 of the ring 50. Here each abutment 58 projects radially outwards from the rim 45 of the embellisher. Here each abutment 59 projects radially inwards from the skirt 61 and projects axially in the direction B1 of the ring 60. More generally, the abutments 59 and 58 lie in the same plane orthogonal to the axis X1, in the direction B1 relative to the ring 60 and in the radially inward direction relative to the skirt 61. Each spring 57 is advantageously disposed axially in the direction B1 relative to the ring, preferably against the ring 60, also in this plane orthogonal to the axis X1. In the radial direction each spring 57 is advantageously disposed between the skirt 61 and the rim 45. The springs 57 and the abutments 58 and 59 are therefore concealed under the ring 50. More generally, each spring 57 is advantageously disposed between the ring 50 and the functional faceplate 21.

Alternatively, only one lock spring 57 is provided or a number of lock springs 57 other than two are provided.

The ring 50 comprises lugs 52 and 53, here two lugs. Alternatively there could be only one lug or a number of lugs other than two. Each lug projects radially outwards from the skirt 61. The lugs of the ring 50 are advantageously regularly distributed about the axis X1. Here the lugs 52 and 53 are for example diametrically opposed.

The base 2 comprises for each lug of the ring 50 a respective locking notch. Here there are therefore two locking notches 54 and 55, visible in particular in FIG. 2, respectively complementary to the lugs 52 and 53. The locking notches 54 and 55 open into the housing 7. The locking notches 54 and 55 are oriented, that is to open, in a radially inward direction relative to the axis X2. When the functional block 1 is received in the housing 7 the notches 54 and 55 are therefore oriented radially inwards relative to the axis X1, now coaxial with the axis X2.

Each notch 54 and 55 forms a path receiving and guiding the lugs 52 and 53 as the block 1 is inserted into the housing 7 along the axis X1. In the axial direction each notch 54 and 55 opens at the level of the edge 9 so as to admit into it the corresponding lug 52 or 53, preferably at the very beginning of insertion of the lugs 52 and 53 of the block 1 into the housing 7.

In the manner of a bayonet blocking system, when the functional block 1 is in the plugged in position and the ring is in the locking position each lug 53 and 54 cooperates mechanically with its corresponding locking notch 54 and 55 to retain, that is to say immobilize or lock, the functional block in the plugged in position. To this end, each notch 54 and 55 comprises a respective axial retaining surface 63 facing in the direction B2 which, when the ring 50 is in the locking position and the block 1 is in the plugged in position, traps the corresponding lug 52 or 53 inserted into the notch 54 or 55 concerned. The lugs 52 and 53, the notches 54 and 55, the springs 57 and the ring 50 then form a lock of the electrical connection point. When the block 1 is in the plugged in position and the ring 50 is in the locking position the lock is in a locking configuration in which the lock retains the block 1 axially in the plugged in position. In the plugged in position of the block 1 placing the ring 50 in the locking position results in the lock being in the locking configuration. To ensure this locking configuration axially retaining the block 1 in the plugged in position the lugs 52 and 53 are captured axially by the notches 54 and 55, being positioned axially beyond the axial retaining surfaces 63 in the direction B2. In the locking configuration each lug 52 and 53 is axially aligned with the retaining axial surface 63 of the corresponding notch 54 or 55. In other words, if it is attempted to remove the block 1 from the housing 7 the lugs 52 and 53 come to abut in the direction F2 against the surfaces 63. The springs 57 act to retain the ring 50 in this locking position, which tends to maintain the lock in the locking configuration.

More generally, when the functional block 1 is in the plugged in position and the lock is in the locking configuration, each lug 53 and 54 cooperates mechanically with its corresponding locking notch 55 and 56 to retain the functional block 1 in its plugged in position.

The lock may change between the locking configuration described hereinabove and an unlocking configuration. In the unlocking configuration the lock allows insertion of the block 1 into the housing 7 as far as the plugged in position and removal of the block 1 from the housing 7 from its plugged in position. When the block 1 is in the plugged in position the unlocking configuration is reached by the user actuating the ring 50 to rotate against the action of the springs 57 until the ring 50 is moved into the unlocking position. In the unlocking position of the ring 50 the lugs 52 and 53 are offset relative to the axial retaining surfaces 63 about the axis X1. The lugs 52 and 53 are therefore no longer aligned with the corresponding surfaces 63 and so said lugs 52 and 53 are no longer axially captured by the notches 54 and 55. The functional block 1 can then be moved freely in translation in the direction F2 relative to the base 2 in order to be removed from the housing 7. Once the lugs 52 and 53 have passed the surfaces 63 in the direction F2 the user can release their action on the ring 50, which is returned automatically to the locking position by the springs 57. When the block 1 is no longer in the plugged in position and the lugs 52 and 53 have passed the surfaces 63 in the direction F2 the lock is in the unlocking configuration, whether the ring is in the locking position or in the unlocking position.

As shown in FIGS. 2, 4 and 9 the lug 53 and the notch 55 have respective helicoidal sloping surfaces 64 and 65. These surfaces 64 and 65 are oriented in a helical direction with respect to the axis X1 and the axis X2, respectively. In other words the surfaces 64 and 65 are inclined relative to the plane orthogonal to the axis X1 and to the plane orthogonal to the axis X2, respectively. The surface 65 faces obliquely in the direction F2 while the surface 64 faces obliquely in the direction B1. The surface 65 is disposed in the direction F2 relative to the surface 63. Accordingly, on insertion of the functional block 1 into the housing 7 toward the plugged in position the notch 55 and the lug 53 come into contact via these helicoidal sloping surfaces 64 and 65 and so the ring 50 is temporarily helicoidally connected to the housing 7 along and about the axis X1. Movement of the block 1 toward the plugged in position then mechanically drives the rotation of the ring 50 from the locking position to the unlocking position. When the lug 53 has passed the retaining surface 63 in the direction B2 the surfaces 65 are no longer in contact. The notch 55 then no longer constrains the position in rotation of the ring 50 to be the unlocking position. The ring 50 is therefore free to be moved back to the locking position by the springs 57 so that, the block 1 being in the plugged in position, the lock goes automatically to the locking configuration. Accordingly, thanks to the surfaces 64 and 65, on insertion of the block 1 into the housing 7 it is not necessary for the user to concern themselves with the rotational position of the ring 50, the latter being placed successively in the unlocking and locking positions automatically. Once the block 1 is in the plugged in position the lock goes automatically to the locking configuration without action by the user.

Alternatively, only the lug, or only the corresponding notch, could include this helicoidal sloping surface. A plurality of lugs and/or a plurality of notches could have such a helicoidal sloping surface to produce the same effects.

Alternatively, some or all of the lugs of the lock could be provided in the housing 7, projecting radially inwards, each corresponding notch being provided on the ring 50, being oriented radially outwards.

In the primary position the shutter 42 preferably immobilizes the lock in the locking configuration by locking the ring 50 in the locking position. In the secondary position the shutter 42 allows the lock to change between the locking configuration and the unlocking configuration, in particular by allowing the ring 50 to rotate freely. Accordingly, when an external plug is plugged into the external socket formed by the functional faceplate 21 and the block 1 is in the plugged in position the lock is immobilized in the locking configuration by the shutter 42. The ring 50 is preferably then immobilized in the locking position so that the user is no longer able to turn it. This prevents removal of the block 1 from the housing when an external plug is plugged in, for safety reasons.

To achieve such operation, as shown in FIGS. 3, 8 and 9 in particular, the shutter 42 advantageously comprises an immobilizing leg 47, for example directed radially, and the ring 50 advantageously comprises a radial opening 48 provided in the skirt 61, preferably passing through it. In the locking position of the ring 50 the leg 47 is radially aligned with the radial opening 48. In the primary position and in the locking position of the ring the leg 47 is received in the radial opening 48 which prevents rotation of the ring 50 by capture of the leg 47 in the opening 48. In the secondary position the leg 47 is outside the opening 48, the leg 47 being moved radially inwards away from the opening 48 so as longer to oppose rotation of the ring 50.

In order to reach the opening 48 in the primary position the leg 47 optionally passes through a radial opening through the module 25, formed in particular through the annular wall 26. In the locking position of the ring 50 the openings 48 and 49 are coradial with respect to the axis X1 so that the leg 47 passes through both of them. The opening 49 advantageously contributes to the stiffness with which the ring 50 is immobilized by the leg 47, by guiding said leg 47 radially.

The functional unit 1 preferably comprises a built-in electronic system. That electronic system comprises for example, as shown in FIG. 9, an electronic circuit card 70 and an electronic circuit card 71. Each electronic circuit card comprises for example a printed circuit and electronic components mounted on the printed circuit. The cards 70 and 71 are disposed inside the module 25, that is to say in the direction B1 relative to the faceplate 21. The card 70 is preferably oriented orthogonally to the axis X1. The card 70 is preferably in the direction B1 relative to the relay 37. The card 71, if present, is for example oriented in a plane parallel to the axis X1, the relay 37 being disposed radially between the card 71 and the axis X1.

The relay 37 is advantageously part of the electronic system which is advantageously supplied with electrical energy received by the rear plug 23. The relay 37 is preferably controlled by one of the cards 70 and 71. The electronic system therefore controls opening and closing of the mobile contacts to activate or deactivate the supply of electrical energy to the functional faceplate 21.

The card 70 advantageously has a built-in telecommunication function. To that end the card 70 for example comprises a telecommunication component and an antenna 74 electrically connected to the telecommunication component. Part of the antenna 74 can be seen in FIG. 9. The part of the antenna 74 visible in FIG. 9 takes the form of a wire of circular arc shape coaxial with the axis X1. The antenna 74 is preferably formed entirely by a flexible wire to facilitate fitting it and to allow movement in rotation of the ring 50 relative to the card 70. In the present example the part of the antenna 74 visible in FIG. 9 is received in an axial circular groove formed in one of the orthoradial compartments 59 of the ring 50. More generally, at least a part of the antenna 74 extends between the ring 50 and the functional faceplate 21. This part of the antenna 74 is preferably disposed radially between the rim 45 of the embellisher 40 and the skirt 61 of the ring. In the axial direction this part of the antenna is advantageously back to back with the ring 60, being disposed in the direction B1 relative to the ring 60. Alternatively, this part of the antenna 74 is back to back with an external radial flange of the embellisher 40 near the ring 60, the flange being carried by the rim 45. In the axial direction this part of the antenna 74 therefore extends between the ring 60 and the plate 41. More generally, a part of the antenna 74 is at the front axial end in the direction F1 of the functional block 1, being concealed under the ring 50 or in the ring 50. Accordingly, at least a part of the antenna 74 is disposed outside the housing 7 and outside the support 3 in the plugged in position of the block 1 so as to ensure optimum reception.

For example, the telecommunication component implements a short or medium range wireless communication protocol, for example of Bluetooth, ZigBee or WiFi type. Accordingly, a user having a terminal, for example a smartphone or a remote controller dedicated to the connection point, can remotely control the electronic system of the connection point via their terminal, the terminal itself being equipped with a compatible telecommunication component. The user is in particular able to control the relay 37 remotely using that terminal.

The electronic system preferably comprises a primary electrical contact 80 carried by the ring 50 as shown in FIG. 7. The primary contact 80 is advantageously situated in the same plane as the springs 57 and/or the circular arc part of the antenna 74. The primary contact 80 is for example fixed to the ring 60, to the face of the ring 60 facing in the direction B1, at a radial position relative to the axis X1. The contact 80 advantageously faces in the direction B1. The electronic system preferably also comprises a secondary contact 81 carried by the functional faceplate 21. In the present example the secondary contact 81 is fixed to the wall 26 of the module 25 at a radial position relative to the axis X1. The contact 81 faces in the opposite direction to the contact 80. The contacts 80 and 81 are connected to the card 70 by any appropriate means, for example electrical conductors.

In the locking position of the ring 50 the contact 80 and the contact 81 are positioned so as to be offset around the axis X1 and therefore not to be in contact with one another. In a control position of the ring 50, which may coincide with the unlocking position or be situated between the unlocking position and the locking position, the contact 81 is brought into electrical contact with the contact 80. The contact position is preferably distinct from the locking position.

Alternatively, and conversely, the locking position may place the contacts 80 and 81 in contact while the control position places the contacts 80 and 81 out of contact.

Placing the contacts 80 and 81 in contact and placing the contacts 80 and 81 out of contact changes the state of the electronic system. For example, the change in state is starting up or shutting down the electronic system, triggering or releasing the relay 37, or placing the telecommunication component in pairing mode.

More generally, the ring 50 rotates to the control position in which the ring 50 commands a change of state of the electronic system, here by way of the contacts 80 and 81.

The electronic system preferably comprises one or more lamps 90, for example in the form of light-emitting diodes, to indicate to the user the status of the electronic system, for example if it is operating, off, faulty, pairing, communicating, and/or if the supply of electrical energy to the faceplate 21 is switched on or switched off. The lamps 90 are advantageously housed in the ring 50 and fastened to said ring 50. The lamps 90 are preferably accommodated radially inside the skirt 61, against the ring 60, axially in the direction B1 relative to the ring 60. The lamps 90 are axially disposed between the wall 26 of the module 25 and the ring 60 of the ring 50. The lamps 90 are therefore visible through the ring 60 when they are lit. The lamps 90 are advantageously connected to the card 70 by flexible connectors that do not impede rotation of the ring 50 relative to the card 70.

Alternatively, instead of being fastened to the ring 50 the lamps are fastened to the wall 26.

More generally, the electronic system advantageously comprises one or more luminous terminations, formed here by the lamps 90. Each luminous termination is preferably disposed between the ring 50 and the functional faceplate 21 so as to be visible through the ring 50 when the luminous termination is lit.

More generally, the ring 50 houses luminous functions of the functional block 1, in particular the lamps 90, the contacts 80 and 81, the antenna 74 and/or the springs 57.

At least one of the other functional blocks, not shown, advantageously differs from the block 1 from the connection point of view in that the functional faceplate forms an external electrical socket conforming to another external electrical socket standard, to another nominal voltage, including a different number of poles, having a different shape of receptacles and/or pins, or constituting for example a socket for charging a terminal.

At least one of the other functional blocks, not shown, advantageously differs from the block 1 from the connection point of view in that the functional faceplate has a function other than that of an external electrical socket, for example a lighting, temperature indication, carrier current Ethernet connection, WiFi routing, presence detection, USB charging, air quality measurement, home automation box or voice-controlled assistant function.

FIGS. 10 and 11 show a second embodiment of a connection point according to the invention, this second embodiment being identical to the first embodiment from FIGS. 1 to 9 except for the differences referred to hereinafter.

In FIGS. 10 and 11 only an axial front part of the module 25 is shown, an axial rear part of the module 25 being omitted to show the internal components of the block 1.

In the second embodiment the flexible antenna 74 is replaced by a rigid antenna 174 comprising a rigid circular part 175 coaxial with the axis X1 and lying in a plane orthogonal to the axis X1, axially between the ring 60 and the plate 41. To accommodate this rigid circular part 175 the module 25 advantageously includes a notch 177 on only a portion of the circumference of the annular wall 26. In the radial direction the part 175 is received between the rim 45 and the skirt 61. In the axial direction the part 175 is received between the ring 60 and the plate 41. The antenna 174 received in the notch 177 therefore does not impede rotation of the ring 50. To connect the part 175 electrically to the card 70 the rigid antenna 174 further comprises a rigid axial part 176 parallel to the axis X1 that extends from the part 175 as far as the card 70. A part of the rigid part 176 is optionally also received in the notch 177. The part 176 serves as a support leg for the part 175 for rigidly fastening it to the card 70. Accordingly, to enable optimum reception at least a part 175 of the antenna 174 is disposed outside the housing 7 and outside the support 3 in the plugged in position of the block 1.

In the second embodiment from FIGS. 10 and 11, instead of the contacts 80 and 81 the electronic system comprises a control button 181, for example of microswitch type, fixed to the surface of the electronic circuit card 70, facing in the direction F1. The button 181 is situated at a radial location on the card 70 relative to the axis X1. The ring 50 comprises a control leg 180 that is for example fixed to the skirt 61. The leg 180 extends parallel to the axis X1 in the direction B1 as far as the vicinity of the card 70. The leg 180 has an axial rear end 183 in the vicinity of the card 70 that is elastic in the axial direction. In a first position of the ring 50, either the locking or the control position, shown in FIG. 10, the leg 180 is offset relative to the button 181 so that the button 181 is not tripped by the leg 180. In a second position of the ring 50, either the locking or the control position not shown in the figures, the leg 180 and the button 181 become coaxial with an axis parallel to the axis X1, the end 183 coming to bear on the button 181 to trip it. This changes the state of the electronic system in a manner equivalent to that of the embodiment from FIGS. 1 to 9.

Instead of the lamps 90 in the second embodiment the card 70 comprises a lamp 190 mounted on the surface of the card 70 in the direction F1. In this embodiment a luminous termination is formed by an axial front end 191 of a light guide 192 extending for example axially form the lamp 190 in the direction F1, the end 191 being positioned axially between the plate 41 and the ring 60 and radially between the rim 45 and the skirt 61. The light guide 192 passes through the notch 177 in order not to impede rotation of the ring 50. The light guide 192 transmits light from the lamp 190 to the end 191 so that when the lamp 190 is lit the end 191 is visible through the ring 60.

There may also be considered, as such and independently of the invention, an electrical connection point that is identical to that represented in FIGS. 1 to 9 or to that represented in FIGS. 10 and 11 except that this connection point differs from those from FIGS. 1 to 11 in that the functional block is fixed permanently to the base, instead of being fixed removably. In this case the connection point has no lock and has no locking and unlocking configurations and the functional block is no longer removable from the housing.

In this case the electrical connection point comprises:
at least one functional block that comprises a functional faceplate;
and
a base for permanently fixing the electrical connection point to a support, such as a wall or an installation box, the base comprising a housing receiving the functional block;
a ring that surrounds the functional faceplate and is disposed so as to be accessible from outside the housing, the ring being rotatable relative to the base.

In this case the connection point advantageously has some or all of the features defined hereinabove for the embodiments from FIGS. 1 to 11, in particular a built-in electronic system in the functional module a change of state of which is commanded by rotation of the ring. To command the change of state the ring is turned between the control position defined hereinabove and an initial position corresponding to the locking position defined hereinabove. In this case the locking position does not serve to place a lock in a locking configuration.

Each feature defined for the embodiments and variants described hereinabove may be used in the other embodiments and variants described hereinabove where technically possible.

The invention claimed is:

1. An electrical connection point, comprising: at least one functional block, which comprises a functional faceplate configured to accept an inserted object substantially parallel to the connection direction of the at least one functional block and a rear electrical plug fastened to the functional faceplate; and a base for permanently fixing the electrical connection point to a support, the base comprising a housing and an internal electrical connector opening into the housing, the functional block being receivable in the housing up to a plugged in position wherein the rear electrical plug is plugged into the internal electrical connector, wherein: the electrical connection point further comprises a lock that evolves between an unlocking configuration wherein the lock allows removal of the functional block from the housing when the functional block is received in the housing and a locking configuration wherein the lock retains the functional block in the plugged in position; and the lock comprises a ring that is part of the functional block, surrounds the functional faceplate and is disposed so as to be accessible from outside the housing when the functional block is received in the housing, the ring being rotatable relative to the rear electrical plug between an unlocking position to place the lock in the unlocking configuration and a locking position for placing the lock in the locking configuration when the functional block is in the plugged in position.

2. The electrical connection point according to claim 1, wherein:
the ring is rotatable relative to the rear electrical plug about a rotation axis on which the functional faceplate is centered and with which the ring is coaxial;
the lock comprises at least one locking notch that is part of the base and opens into the housing, being oriented when the functional block is received in the housing radially inwards relative to the rotation axis;
the ring comprises for each locking notch a respective lock that projects radially outwards relative to the rotation axis; and
when the functional block is in the plugged in position and the lock is in the locking configuration each lug cooperates mechanically with its corresponding locking notch to retain the functional block in the plugged in position.

3. The electrical connection point according to claim 2, wherein at least one of the locking notches and its corresponding lug comprise a helicoidal sloping surface and are configured so that:
on introduction of the functional block into the housing toward the plugged in position the locking notch and the lug come into contact via the helicoidal sloping surface to mechanically drive rotation of the ring to the unlocking position; and
when the functional block is in the plugged in position the locking notch and the lug are no longer in contact via the helicoidal sloping surface, which allows placing of the ring in the locking position.

4. The electrical connection point according to claim 1, wherein the lock further comprises at least one lock spring that exerts an elastic force urging the ring into the locking position when the ring is in the unlocking position, each lock spring being disposed between the ring and the functional faceplate.

5. The electrical connection point according to claim 1, wherein the functional block comprises an electronic system that comprises an electronic circuit card disposed inside the functional block, the ring being rotatable to a control position wherein the ring commands a change of state of the electronic system, the control position being distinct from the locking position.

6. The electrical connection point according to claim 5, wherein the electronic system comprises a primary contact carried by the ring and a secondary contact carried by the functional faceplate, the primary contact and the secondary contact being positioned so as to be placed in electrical contact with one another when the ring reaches the control position so as to command the change of state of the electronic system.

7. The electrical connection point according to claim 5, wherein the electronic circuit card comprises a control button positioned on the surface of the electronic circuit card, the ring comprising a control leg that in the controlled position of the ring presses on the control button to command the change of state of the electronic system.

8. The electrical connection point according to claim 5, wherein the electronic system comprises an antenna that is electrically connected to the electronic circuit card, which extends at least in part between the ring and the functional faceplate.

9. The electrical connection point according to claim 5, wherein the electronic system comprises a luminous termination that is disposed between the ring and the functional faceplate so as to be visible through the ring when the luminous termination is lit.

10. The electrical connection point according to claim 1, wherein the functional faceplate forms an external electrical socket opening to the outside of the housing when the functional block is received in the housing, the external electrical socket being designed so that an external electrical plug of an electrical device is plugged into the external electrical socket in order to supply said electrical device via this external electrical plug with electrical energy received by the rear electrical plug.

11. The electrical connection point according to claim 10, wherein the functional block further comprises a shutter that is mobile between:
- a primary position wherein the shutter immobilizes the lock in the locking configuration, the shutter being placed in the primary position by the external electrical plug when the external electrical plug is plugged into the external electrical socket; and
- a secondary position wherein the shutter allows the lock to change between the locking configuration and the unlocking configuration, the functional block comprising at least one safety spring that exerts an elastic force urging the shutter into the secondary position when the shutter is in the primary position.

12. The electrical connection point according to claim 1, wherein the inserted object is an electrical plug.

\* \* \* \* \*